Patented Oct. 30, 1945

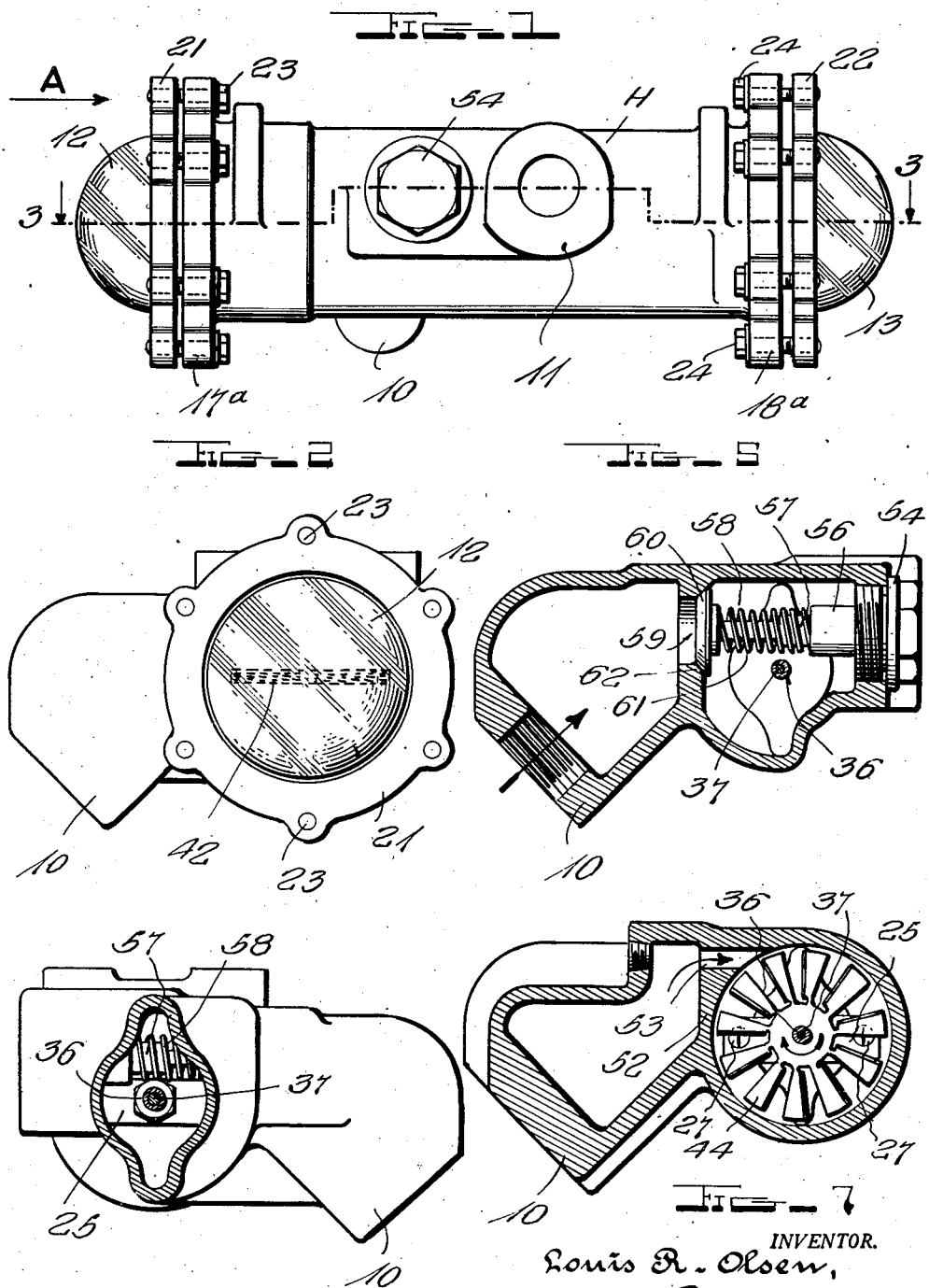

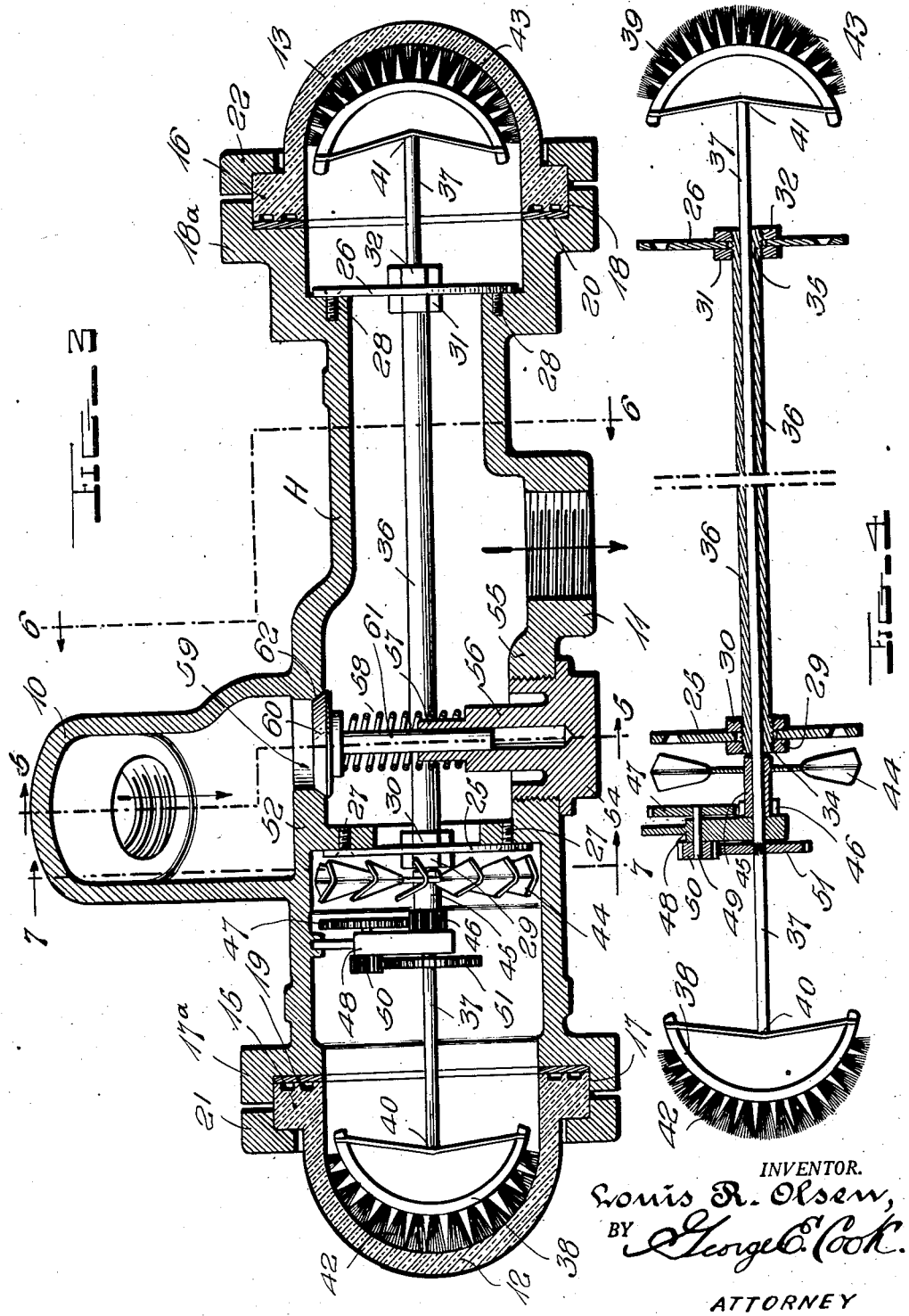

2,387,805

UNITED STATES PATENT OFFICE 2,387,805

VISUAL FLUID FLOW INDICATOR

Louis R. Olsen, Erie, Pa., assignor to Erie Meter Systems, Inc., Erie, Pa., a corporation of Pennsylvania Application November 12, 1942, Serial No. 465,396

2 Claims. (Cl. 116—117)

The instant invention relates to visual fluid flow indicators and more particularly to such an indicator especially adapted for use in gasoline dispensing devices and the like.

One of the primary objects of the invention is to provide means, actuated by the flow of fluid, for cleaning the lens or observation window in devices of the type specified.

Yet another object is the construction of a device which will efficiently operate under conditions of varied fluid flow encountered in present day liquid dispensing systems.

Still another purpose is the formation of an indicator and lens or observation window-cleaning means for incorporation in a fluid dispensing system.

The above and other aims and objects will be apparent from the detailed description hereinafter appearing when taken in conjunction with the appended drawings showing a preferred embodiment of the invention and in which Fig. 1 is a side elevational view of the visual flow indicator;

Fig. 2 is an end view looking in the direction of the arrow A in Fig. 1;

Fig. 3 is a horizontal sectional view on a larger scale taken on line 3—3 of Fig. 1;

Fig. 4 is a detailed view, partly in section, of the combined indicator and lens or window observation cleaning device and the driving means therefor;

Fig. 5 is a transverse sectional view taken on line 5—5 of Fig. 3;

Fig. 6 is a transverse sectional view taken on line 6—6 of Fig. 3; and

Fig. 7 is a transverse sectional view taken on line 7—7 of Fig. 3.

Present day laws require the use of visual flow indicators in gasoline or the like dispensing systems. Heretofore, these usually consisted of a cylindrical glass container with a rotating vane or propeller therein. There are a number of objections to this arrangement. Firstly, the glass containers eventually become clouded by deposits from the liquid being dispensed necessitating frequent removal and cleaning of said containers, and secondly, colored fluids frequently hide the vane from view.

The following detailed description and appended drawings illustrate one form of visual flow indicator in which the objectional features above mentioned have been eliminated by the incorporation of a rotating indicator brush for contacting the inner surface of an indicator window or lens to constantly maintain the latter cleaned. In other words, the rotating brush has dual function. A difficulty was encountered, however, in driving the indicator brush under conditions of varied fluid flow. Originally the means for cleaning the observation lens or window (said window also serving as part of the indicator means) was connected by a shaft directly to and driven by a vane or propeller interposed in the path of fluid flowing from the inlet to the indicator housing to the outlet from said housing. This arrangement operates satisfactorily when a substantial quantity of liquid is flowing through the system and at a constant rate. However, in modern gasoline dispensing systems the service station attendant invariably reduces the rate of liquid flow by means of the hose nozzle valve to dispense the exact quantity of liquid desired through the metering device. Consequently, the fluid flow indicator must operate at reasonably low rates of fluid flow as well as at maximum rates and this is most efficiently accomplished in a manner now to be described in detail.

In the drawings, the reference character H designates the hollow indicator casing or housing having a threaded inlet coupling 10 and a threaded outlet coupling 11. It will be understood that the liquid being dispensed has passed through the metering portion of the pump prior to entering the inlet coupling 10 and flows from the outlet coupling 11 through the pump hose provided with a nozzle and nozzle valve. The opposed ends of the housing are open and in a plane normal to that of the couplings.

Hemispherical lenses or windows of glass or the like 12 and 13 close said open ends, each lens having a flange 15 and 16, respectively, resting in annular seats 17 and 18 of the housing H. Each seat 17 and 18 is equipped with an annular gasket 19 and 20, respectively. For holding the lenses in position rings 21 and 22 having circumferentially spaced threaded apertures are provided. By viewing Fig. 1 it will be seen that housing seats 17 and 18 have annular flanges 17ª and 18ª also provided with threaded circumferentially spaced apertures. When the apertures in the rings 21 and 22 and flanges 17ª and 18ª are respectively aligned, threaded bolts 23 and 24 are passed therethrough and when the bolts are tightened the flanges 15 and 16 of the lenses 12 and 13 are brought into firm frictional contact with the gaskets 19 and 20 assuring a fluid-tight seal for the opposed ends of the housing H.

Referring now particularly to Figs. 3 and 4 it will be seen that the housing H has a pair of spaced centrally apertured bearing plates 25 and 26 therein, said plates being circumferentially supported within the housing by screws or the like fastening elements 27 and 28, respectively. For securing bearing plates 25 and 26 to a hollow, long sleeve 36 nuts 29 and 30, and 31 and 32 are threaded on the ends 34 and 35 respectively of said long hollow sleeve 36, the latter being thus supported axially in the housing H by the plates 25 and 26 as seen in Figs. 3 and 4.

A driving shaft 37 has brushes or wipers 38 and 39 secured thereto at its opposed ends 40 and 41, respectively. It will be observed that each brush or wiper is characterized by a substantially narrow semicircular band of bristles 42 and 43 and the latter may be made of straw, steel or other desirable material or may be a strip of material such as rubber, cloth or the like. The bristles 42 and 43 are in frictional contact with the interior surface of each of lenses 12 and 13, see Fig. 3.

The means for driving shaft 37 and the brushes 38 and 39 secured thereto will now be described. A vane or propeller 44 has a hub 45, the latter rotatably mounted on driving shaft 37. One end of hub 45 is formed with a pinion 46 meshing with gear 47 supported by bearing 48 depending into the interior of and supported by housing H. A shaft 49 secured to gear 47 is provided with a pinion 50 fastened thereto, the latter meshing with gear 51 fixedly secured to shaft 37. The housing H has an interior transverse wall 52 separating inlet coupling 10 from outlet coupling 11. Wall 52 has a narrow by-pass or passageway 53 leading directly toward and tangentially of the blades of vane or propeller 44, see Fig. 7. It will now be understood that any liquid entering through coupling 10 will flow through passageway 53 in the wall 52 to tangentially impinge upon and rotate the blades constituting propeller 44 to drive the indicator brushes 38 and 39, through the speed reducing gear train 46, 47, 49, 50 and 51 and driving shaft 37; the liquid flowing off through outlet coupling 11 to the pump hose. Vane or propeller 44 will rotate with but slight fluid pressure and a very small quantity of the latter is sufficient for its operation.

Means are provided for taking care of maximum fluid flow through the system, that is to say, when the hose nozzle valve is open by the pump attendant to dispense a maximum quantity of liquid. This means comprises an externally threaded plug 54 threaded into a wall 55 opposite wall 52 of the housing H. The plug 54 has an upstanding centrally apertured valve stem guide 56, a reduced portion 57 of said stem guide seating valve spring 58. The reference numeral 59 designates a valve member having a head 60 and a stem 61, the latter slidable in the aperture of stem guide 56. The head 60 is adapted to normally seat in apertured valve seat 62 in wall 52 of the housing H through action of valve spring 58. Consequently, it will now be understood, that increased pressure due to maximum flow of the liquid brought about through opening of the nozzle valve by the attendant, will force valve 59 in a downwardly direction viewing Fig. 3 against tension of spring 58, thus permitting the liquid to escape through outlet coupling 11. Of course, a quantity of liquid is simultaneously flowing through by-pass or passageway 53 to rotate the combined flow indicators and lens-cleaning members 38 and 39.

From the above it will be appreciated that there has been constructed a device well adapted for its intended functions. Obvious modifications will occur to those skilled in the art and it is contemplated to cover all such and to be limited in this respect only as may be necessary by the scope of the claims hereto appended.

What I claim and desire to secure by Letters Patent is:

1. A visual fluid flow indicator comprising a hollow housing having an inlet and an outlet coupling and two openings at the ends thereof in a plane normal to said couplings, a separate window closing each of said openings, a wall within said housing separating said inlet coupling from the interior of the housing, a shaft axially mounted within said housing, said shaft having two wipers, one at each of its ends, one of said wipers contacting the interior of one window, and the second wiper contacting the interior of the other window, a propeller mounted within said housing, said wall having a by-pass leading to said propeller, means connecting said propeller to said shaft to rotate the latter upon the flow of fluid from said inlet coupling through said by-pass to said outlet coupling, and a valve within said housing in spaced relation to said propeller operable to allow additional fluid to flow from said inlet to said outlet coupling during increased fluid pressure without said additional fluid impinging on said propeller.

2. A visual fluid flow indicator comprising a hollow housing having an inlet and an outlet coupling and opposed openings at the ends thereof in a plane normal to said couplings, a separate window closing each of said openings, a wall within said housing separating said inlet coupling from the interior of the housing, an elongated shaft axially mounted within said housing, said shaft having two brushes, one at each of its opposed ends, one of said brushes contacting the interior of one window, and the second brush contacting the interior of the other window, a propeller mounted within said housing, said wall having a by-pass leading to said propeller, means connecting said propeller to said shaft to rotate the latter upon the flow of fluid from said inlet coupling through said by-pass to said outlet coupling, a valve within said housing, said valve comprising a removable plug threaded into a wall of the casing, said plug having a central aperture and an upper reduced portion, a spring seated on said reduced portion, a headed valve having a stem slidable in the aperture of said plug, the head of said valve having a seat in said first mentioned wall, said valve being movable against the tension of said spring to allow fluid to flow from said inlet to said outlet coupling during increased fluid pressure.

LOUIS R. OLSEN.